(12) United States Patent
Koehler et al.

(10) Patent No.: US 8,215,621 B2
(45) Date of Patent: Jul. 10, 2012

(54) LINEAR FILAMENT COMPRESSION AND TORSION SPRING

(75) Inventors: Frederick B. Koehler, Tucson, AZ (US); Ward D. Lyman, Tucson, AZ (US); Kenneth E. Schmidt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/050,754

(22) Filed: Mar. 17, 2011

(65) Prior Publication Data

US 2011/0163487 A1 Jul. 7, 2011

Related U.S. Application Data

(63) Continuation of application No. 11/710,381, filed on Feb. 23, 2007, now Pat. No. 7,950,634.

(51) Int. Cl.
*F16F 1/00* (2006.01)
(52) U.S. Cl. ..................... 267/182; 267/141.2
(58) Field of Classification Search ............... 267/103, 267/141.2, 160, 178, 136, 70
See application file for complete search history.

(56) References Cited

U.S. PATENT DOCUMENTS

| | | | |
|---|---|---|---|
| 2,836,912 A | 6/1958 | Ranucci | |
| 3,847,380 A * | 11/1974 | Kearns | 267/179 |
| 4,672,713 A * | 6/1987 | Newton et al. | 16/197 |
| 4,856,765 A * | 8/1989 | Kohno et al. | 267/166 |
| 5,632,473 A | 5/1997 | Dias Magalhaes Queiroz | |
| 5,821,664 A | 10/1998 | Shahinpoor | |
| 7,063,388 B2 | 6/2006 | Chen | |
| 7,445,616 B2 | 11/2008 | Petrakis | |
| 7,950,634 B2 * | 5/2011 | Koehler et al. | 267/182 |
| 2008/0203633 A1 | 8/2008 | Koehler et al. | |

OTHER PUBLICATIONS

"U.S. Appl. No. 11/710,381, Final Office Action mailed Nov. 12, 2010", 5 pgs.
"U.S. Appl. No. 11/710,381, Non Final Office Action mailed Jul. 28, 2010", 9 pgs.
"U.S. Appl. No. 11/710,381, Notice of Allowance mailed Jan. 27, 2011", 6 pgs.
"U.S. Appl. No. 11/710,381, Response filed Jan. 20, 2011 to Final Office Action mailed Nov. 12, 2010", 5 pgs.
"U.S. Appl. No. 11/710,381, Response filed Aug. 30, 2010 to Non Final Office Action mailed Jul. 28, 2010", 8 pgs.

* cited by examiner

*Primary Examiner* — Pamela Rodriguez
(74) *Attorney, Agent, or Firm* — Schwegman, Lundberg & Woessner, P.A.

(57) ABSTRACT

A spring including a wire having an elasticity by which the wire is compressible by an external force to a first position at which first and second ends thereof of are separated by a first distance and when the force is removed or an electrical current applied, the wire is extensible in response to an internal spring force to a second position at which the wire is substantially straight. A spring assembly is disclosed including a plurality of inventive wires cross-coupled with a support structure consisting of a plurality of coaxial rings. In the assembly, the wires extend parallel to an axis through a center of the rings.

15 Claims, 3 Drawing Sheets

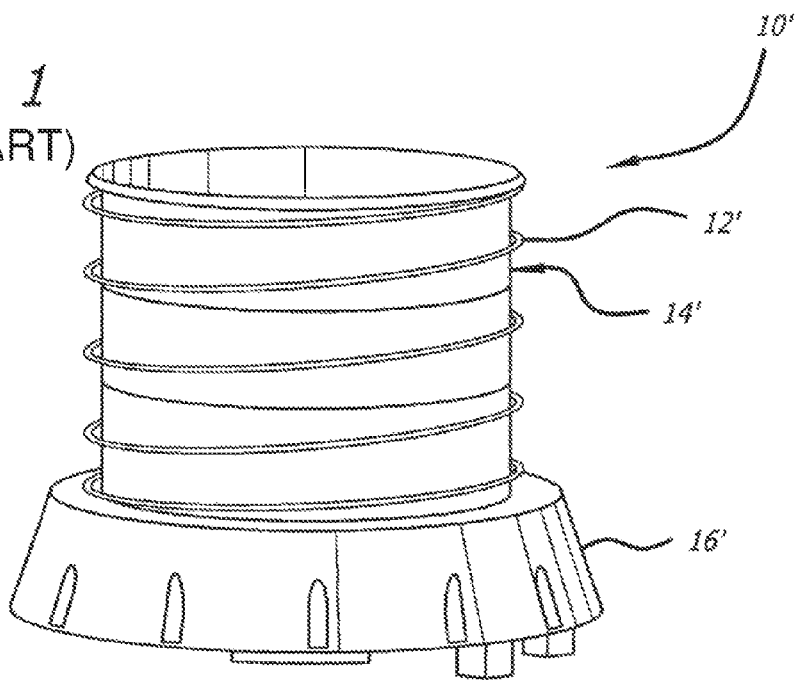
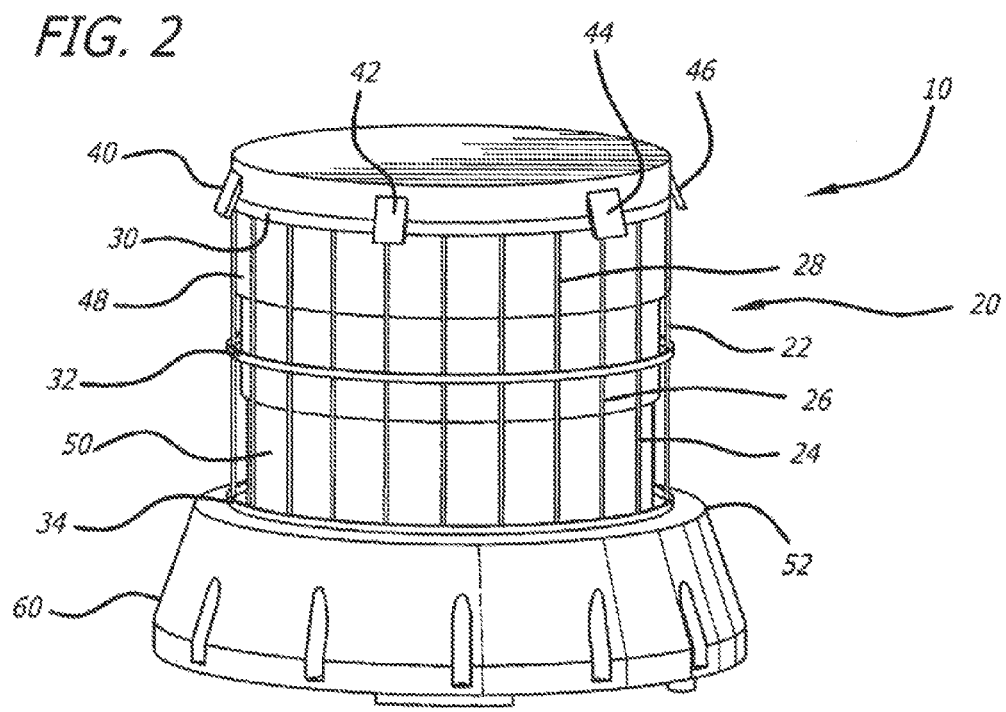

LINEAR FILAMENT COMPRESSION AND TORSION SPRING

CLAIM OF PRIORITY

This application is a continuation of and claims the benefit of priority under 35 U.S.C. §120 to U.S. patent application Ser. No. 11/710,381, entitled "LINEAR FILAMENT COMPRESSION AND TORSION SPRING", Filed on Feb. 23, 2007, which is hereby incorporated by reference herein in its entirety.

STATEMENT REGARDING GOVERNMENT FUNDING

This invention was developed in part as a result of funding provided by the United States Government; specifically, contract number N00024-03-C-6111, "Standard Missile 3 (SM-3) Through Completion" with Naval Sea Systems Command. As a result of this funding, the United States Government has certain rights in this invention.

BACKGROUND OF THE INVENTION

1. Field of the Invention

The present invention relates to deployment mechanisms and systems. More specifically, the present invention relates to spring loaded deployment mechanisms and systems used for space and other applications.

2. Description of the Related Art

Operation in space, underwater and other hostile environments requires precise and reliable operation of numerous mechanisms to secure, deploy, move, and release various components. Space vehicles, in particular, frequently contain mechanisms that must move by some combination of sliding, rolling, or rotating and the successful operation thereof is usually mission-critical. For example, solar arrays are often stowed for launch, but once in space, are deployed to maximize exposure to the sun. Antennas are often deployed to maintain adequate signal strength. Remote-sensing optical payloads are often deployed to track a scene of interest or examine new targets as the space vehicle orbits. Internal lenses and mirrors of optical sensors are often mounted on adjustable mechanisms to maintain or adjust focus or to reject undesirable signals. Space vehicles must maintain attitude either by spinning or by the use of flywheels or gyroscopes. All of these devices, and many others, depend upon the successful and long-term operation of moving mechanical assemblies.

Many types of deployment mechanisms are known and used for various applications. For certain applications, spring-loaded deployment mechanisms are ideally suited. Helical (coil) springs are typically used for spring-loaded spacecraft deployment. However, for some applications, there is a need to reduce the weight associated with the deployment mechanism. In addition, the lateral stiffness of conventional helical springs is deficient for some applications.

Hence, a need remains in the art for a low-cost, lightweight spring for providing a desired force in deployment at a given weight specification with enhanced lateral stability.

SUMMARY OF THE INVENTION

The need in the art is addressed by the novel spring of the present invention. Generally, the inventive spring includes at least one wire having an elasticity by which the wire is compressible by an external force to a first position at which first and second ends thereof of are separated by a first distance and extensible in response to an internal spring force or stored energy to a second position at which the wire is substantially straight, such that the first and second ends are separated by a second distance, the second distance being substantially greater than the first distance.

In the illustrative embodiment, the spring is implemented with Nitinol™ superelastic alloy. As an alternative, the wire can be a shape memory alloy. In this case, the wire would be extensible in response to the application of current thereto.

In a more specific implementation, a spring assembly is disclosed including a plurality of such wires cross-coupled with a support structure consisting of a plurality of coaxial rings. In the assembly, the wires are parallel to an axis extending through a center of the rings.

BRIEF DESCRIPTION OF THE DRAWINGS

FIG. 1 is a perspective view of a conventional helical spring assembly.

FIG. 2 is a perspective view of a spring assembly implemented in accordance with an illustrative embodiment of the present teachings.

DESCRIPTION OF THE INVENTION

Figure 3:
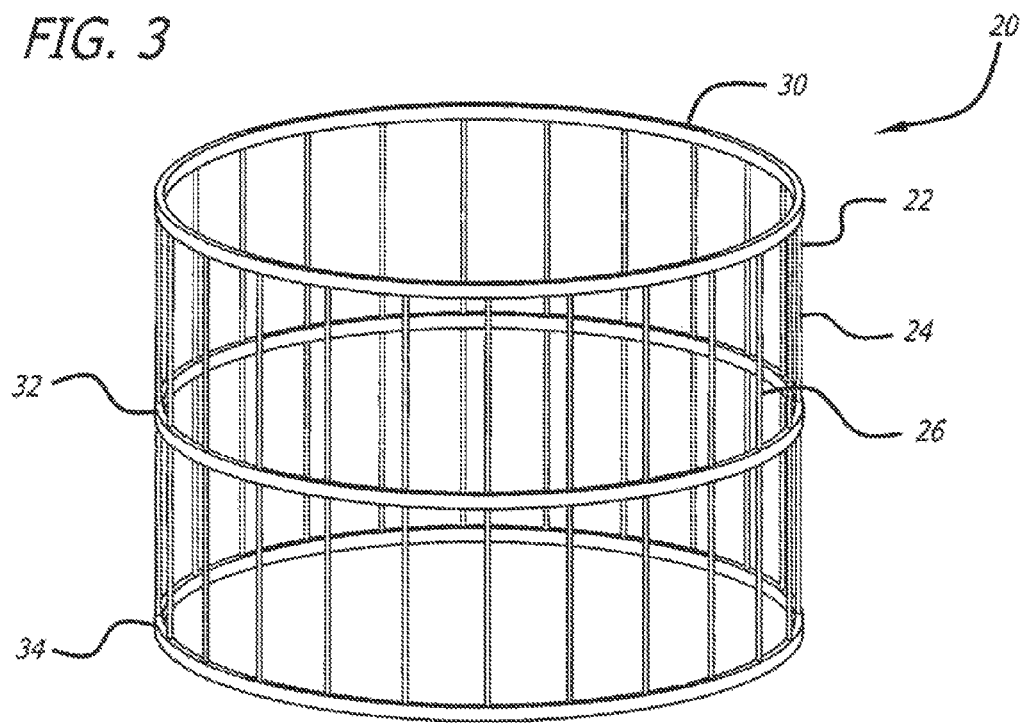
FIG. 3 is a perspective view of the spring of the illustrative embodiment of the present invention in a fully extended configuration.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a perspective view of a conventional helical spring assembly. As shown in FIG. 1, the conventional helical spring assembly 10' includes a helical spring 12' which is typically implemented with a single coil of wire which may or may not be wound around a tube 14'. The tube is supported on a base 16'. The tubing may be required to provide lateral stiffness for certain applications or the tubing may be part of the mechanism being deployed of which spacecraft deployment is one example.

FIG. 2 is a perspective view of a spring assembly implemented in accordance with an illustrative embodiment of the present teachings. As shown in FIG. 2, the assembly 10 includes a spring 20 of novel design. In accordance with the present teachings, the spring 20 includes plural substantially straight wires e.g., 22, 24, 26 and 28. In accordance with the present teachings, each wire has an elasticity or stored energy by which the wire is compressible by an external force to a first position at which first and second ends thereof of are separated by a first distance and, when the force is removed or an electrical current is applied in the case of shape memory alloy wire, the wire is extensible in response to an internal spring force or released energy to a second position at which the wire is substantially straight, such that the first and second ends are separated by a second distance, the second distance being substantially greater than the first distance. In the illustrative embodiment, each wire is implemented with Nitinol, aluminum-copper, or other material that has the property of superelasticity or shape memory, that is to say a reversible strain capacity of up to 10% or a stored energy due to an electrically or thermally reversible phase change in the material. Nitinol is available from many manufacturers such as Nitinol Devices and Components of Fremont, Calif.

The wires e.g., 22, 24, 26 and 28 are cross-coupled with a support structure consisting in the illustrative embodiment of a plurality of coaxial rings 30, 32 and 34. In the assembly, the wires are parallel to an axis extending through a center of the rings. The first ring 30 is retained by flanges 40, 42, 44, 46, etc. in an upper tube 48. The wires e.g., 22, 24, 26 and 28 surround the periphery of the upper tube 48 and a lower tube 50 into which the upper tube reciprocates during the compression and extension of the spring 20. That is, the diameters of the upper and lower tubes are dissimilar to allow for relative translation therebetween. A base 52 is provided at the bottom of the lower tube 50 into which the third ring 34 seats. The tubes 48 and 50 are part of an assembly to be deployed and hence are not part of the invention per se.

FIG. 3 is a perspective view of the spring of the illustrative embodiment of the present invention in a fully extended configuration. The number of wires e.g., 22, 24, 26 and 28 in the spring 20 may be determined by one of ordinary skill in the art with respect to a given spring force required and compression force to be used. In addition, the spring constant is determined by the number of wires, the diameter of the wires and the type of material used in construction. The length of the wires should be determined with respect to the desired length of travel of the object to be deployed.

In the illustrative embodiment, the wires are made of Nitinol™, aluminum-copper, or other material that has the property of superelasticity or shape memory as mentioned above with a diameter in the range of 0.001-0.080 inches.

In addition, the number of support rings may vary based on the requirements of the application as well. As will be appreciated by those skilled in the art, the wires may be secured to the support rings by any suitable means including crimping, brazing, bonding, etc. The support rings 30, 32 and 34 may be fabricated of any suitable metal (e.g., titanium, aluminum, etc.) or a composite material.

Figure 4A:
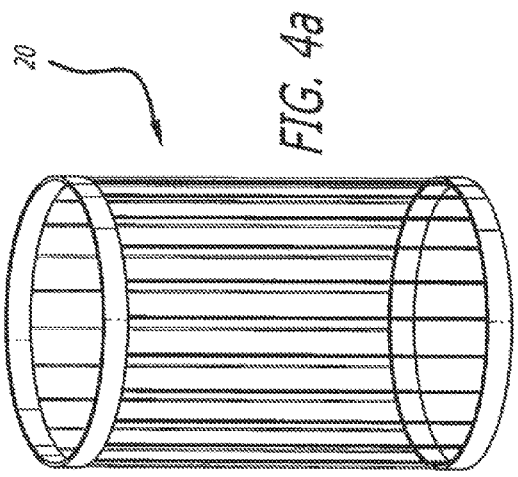
FIGS. 4a-d are diagrams depicting various stages of compression and extension of the spring of FIG. 3 in a configuration without the intermediate support ring.
Figure 4B:
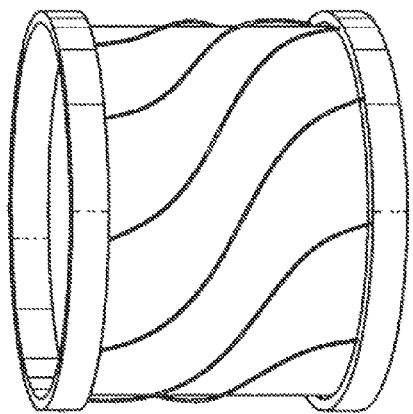
Figure 4C:
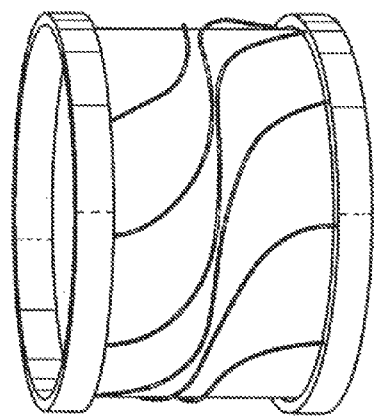
Figure 4D:
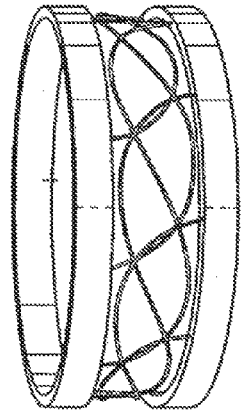

FIGS. 4*a-d* are diagrams depicting various stages of compression and extension of the spring of FIG. 3. In FIG. 4*a*, the spring 20 is fully extended. In FIG. 4*b*, the spring is initially compressed and the upper and lower rings 30 and 34 thereof are pressed toward each other. At this point, the wires are bent as shown. With additional compression, the upper and lower rings 30 and 34 move closer to each other and the wires are further deformed as shown in FIG. 4*c*. Finally, the spring is fully compressed as shown in FIG. 4*d*.

Figure 5:
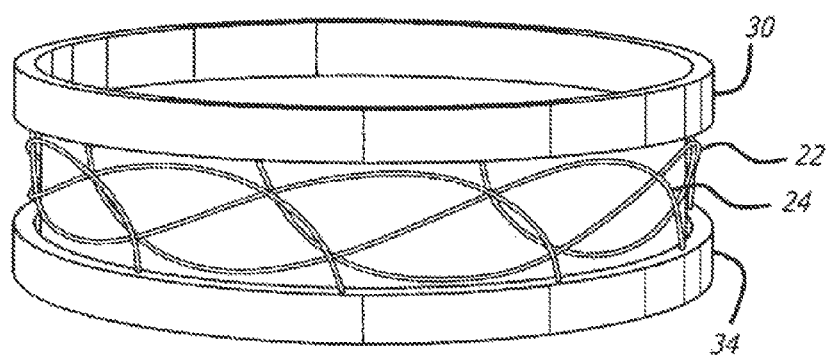
FIG. 5 is a magnified view of the inventive spring depicted in FIG. 4d.

FIG. 5 is a magnified view of the inventive spring depicted in FIG. 4*d*. Note that the wires or filaments 22 and 24 neatly stow with some rotation of one or more of the support rings 30 or 34. Use of an intermediate support ring 32 (not shown) allows the end rings 30 and 34 to remain rotationally fixed and thus, in this configuration, the invention may be used in any situation where a traditional helical or coil spring might be used.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

What is claimed is:

1. A spring comprising:
   a support structure that includes a plurality of coaxial rings, wherein said plurality of coaxial rings includes a first end ring, a second end ring and an intermediate ring between said first end ring and said second end ring; and
   a plurality of wires coupled via said support structure, each wire extending from the first ring to the second ring, each wire having an elasticity by which said wire is compressible to a first position at which first and second ends thereof are separated by a first distance and extensible in response to an internal spring force or stored energy to a second position at which said wire is substantially straight, such that said first and second ends are separated by a second distance, said second distance being substantially greater than said first distance, wherein said first end ring is retained by flanges on a first tube that is positioned inside said plurality of wires.

2. The spring of claim 1 wherein each said wire is a superelastic alloy.

3. The spring of claim 1 wherein each said wire is a shape memory alloy.

4. A method for providing a spring force comprising:
   providing a support structure that includes a plurality of coaxial rings, wherein said plurality of coaxial rings includes a first end ring, a second end ring and an intermediate ring between said first end ring and said second end ring;
   providing a plurality of wires coupled via said support structure, each wire extending from the first ring to the second ring, said plurality of wires having an elasticity by which said wires are compressible by an external force to a first position at which first and second ends thereof are separated by a first distance and when said force is removed or an electrical current applied, extensible in response to an internal spring force or stored energy to a second position at which said wires are substantially straight, such that said first and second ends are separated by a second distance, said second distance being substantially greater than said first distance; and
   providing a first tube positioned inside said plurality of wires, said first tube including flanges that retain said first end ring.

5. A compression spring assembly comprising:
   an upper tube;
   a lower tube that has a diameter different than said upper tube such that said upper and lower tubes move telescopically relative to one another; and
   a plurality of wires surrounding a periphery of said upper and lower tubes, each wire having an elasticity by which said wire is compressible by an external force to a first position at which first and second ends thereof of are separated by a first distance and when said force is removed, said wire is extensible in response to an internal spring force to a second position at which said wire is substantially straight, such that said first and second ends are separated by a second distance, said second distance being substantially greater than said first distance.

6. The compression spring assembly of claim 5, wherein said wires are a superelastic alloy.

7. The compression spring assembly of claim 5, wherein said wires are a shape memory alloy.

8. The compression spring assembly of claim 5, further comprising a support structure that couples said plurality of wires.

9. The compression spring assembly of claim 8, wherein said support structure includes first and second coaxial rings.

10. A method for providing a spring force comprising:
providing an upper tube and a lower tube that has a diameter different than said upper tube such that said upper and lower tubes move telescopically relative to one another; and
providing a plurality of wires that surround a periphery of said upper and lower tubes, each of said wires having an elasticity by which said wires are compressible by an external force to a first position at which first and second ends thereof are separated by a first distance and when said force is removed or an electrical current applied, extensible in response to an internal spring force or stored energy to a second position at which said wires are substantially straight, such that said first and second ends are separated by a second distance, said second distance being substantially greater than said first distance.

11. The method of claim 10 further comprising providing a support structure that includes a plurality of coaxial rings such that each of said coaxial rings couples said plurality of wires.

12. The method of claim 10 wherein providing a support structure that includes a plurality of coaxial rings includes providing a first end ring, a second end ring and an intermediate ring between said first end ring and said second end ring.

13. A compression spring assembly comprising:
an upper tube;
a lower tube that has a diameter different than said upper tube such that said upper and lower tubes move telescopically relative to one another;
a plurality of wires surrounding a periphery of said upper and lower tubes, each wire having an elasticity by which said wire is compressible by an external force to a first position at which first and second ends thereof of are separated by a first distance and when said force is removed, said wire is extensible in response to an internal spring force to a second position at which said wire is substantially straight, such that said first and second ends are separated by a second distance, said second distance being substantially greater than said first distance; and
a support structure that includes a plurality of coaxial rings such that each of said coaxial rings couples said plurality of wires, wherein said plurality of coaxial rings includes a first end ring, a second end ring and an intermediate ring between said first end ring and said second end ring.

14. The compression spring assembly of claim 13, wherein said wires are a shape memory alloy.

15. The compression spring assembly of claim 13 wherein each wire is parallel to an axis extending through a center of said coaxial rings.

* * * * *